United States Patent Office 2,990,851
Patented July 4, 1961

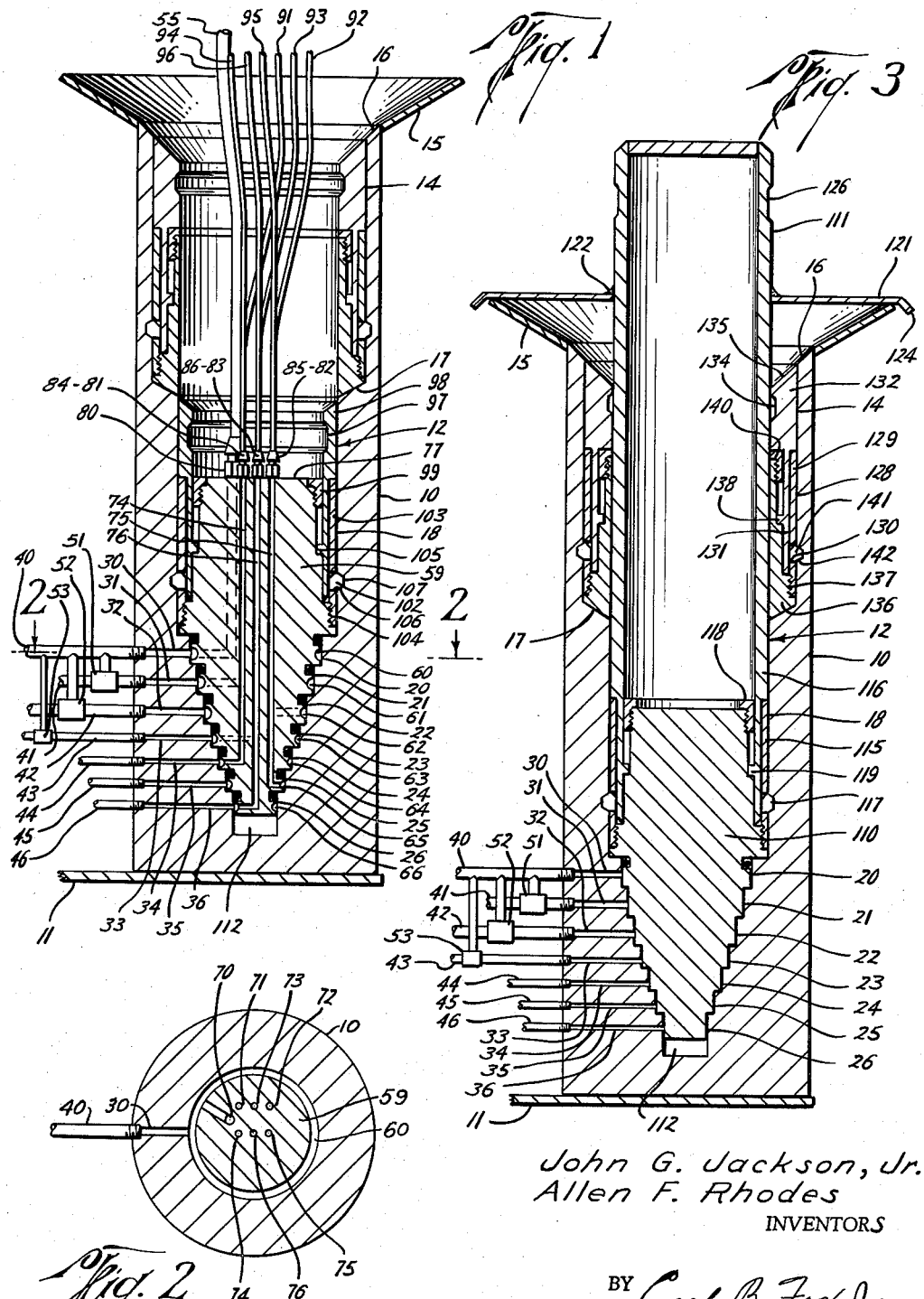

2,990,851
MULTIPLE VALVE AND CONNECTION
John G. Jackson, Jr., Angleton, and Allen F. Rhodes, Houston, Tex., assignors to McEvoy Company, Houston, Tex., a corporation of Texas
Filed June 23, 1958, Ser. No. 743,907
8 Claims. (Cl. 137—595)

This invention pertains to multiple flow control devices for controlling fluid flow through a plurality of conduits, such as pipes or hoses, and for providing connection between such conduits and a like plurality of other conduits. The devices are capable of being controlled remotely, so that the devices may be disposed at inaccessible locations such as, for example, beneath the surface of a body of water and controlled from the water surface.

The devices of the invention include a body having an opening from one side. A plug element is sealed within the body. The plug element has a plurality of passages therethrough each connected at one end to a valved flow line and at the other end to a flow line extending to the control point, which is usually at a remote location. Hydraulic fluid is supplied through one passage to control the valves, which are hydraulically operated, of all other passages. The passaged plug may be replaced by a blind plug which includes protection means for the body. Changing of the plugs may be accomplished from a remote location, and each plug is firmly secured in the body during use.

A principal object of the invention is to provide remote operated connection means for a plurality of flow lines.

Another principal object of the invention is to provide remote operated flow control means for a plurality of flow lines.

Another object of the invention is to provide remote operated connection and flow control means for a plurality of flow lines.

Still another object of the invention is to provide such flow control means which is operated hydraulically.

Other objects and advantages of the invention will appear from the following detailed description of a preferred embodiment of the invention, with reference to the accompanying drawings showing the preferred embodiment, of which:

FIGURE 1 is a vertical axial section through the preferred embodiment of the invention, showing the device as used for connecting multiple conduits and for controlling flow therethrough;

FIGURE 2 is a horizontal section taken at line 2—2 of FIGURE 1; and,

FIGURE 3 is a vertical axial section similar to FIGURE 1, only showing the protection means in place such as when the device is not in use.

Referring now to the drawings in detail, and first to FIGURE 1, the preferred form of the apparatus includes a cylindrical body 10 which is usually supported with its axis vertically disposed as shown in the drawing. Body 10 is usually steel or some material of like properties suitable for the adaptations to be described. Body 10 is usually supported upon a horizontal steel plate 11. Body 10 includes an opening 12 therewithin, the opening 12 being of stepped circular cross sections and opening upwardly from body 10 at its larger end. The upper portion 14 of opening 12 is cylindrical.

A funnel 15 is secured around the top of the body, for example by welding, and the funnel is augmented by a merging conical surface 16 at the top of the body to provide an entrance guide thereinto. Below the cylindrical part 14 of the body opening, the opening is reduced in diameter by a flared shoulder 17 of conical downward converging form. A second cylindrical part 18 of the opening is below shoulder 17. Below opening part 18 the opening is diminished stepwise downwardly, the steps consisting of coaxial cylindrical opening parts 20—26 each of successively reduced diameter. Opening part 26 terminates above the lower end of body 10. A passage extending from the exterior of the body communicates with each step part 20—26 of the opening, these passages being designated 30—36, respectively. These passages are each tapped at their outer ends to receive the threaded ends of pipes 40—46. Each of the pipes 41—46 is fitted with a hydraulic operated valve. Pipes 41—43 are shown having hydraulic operated valves 51—53, respectively, connected intermediate their lengths. Pipes 44—46 are identically each equipped with a hydraulic operated valve, these not being shown in the drawings but being identical with valves 51—53, and installed in pipes 44—46 in the same manner. These valves open upon application of hydraulic pressure supplied from a remote source through hose 55 and pipe 40. The valves are normally closed by spring action when no hydraulic pressure is supplied. Many types of hydraulic valves suitable for such applications are known in the arts and any such may be used. A skilled practitioner can select a suitable valve for his use. Therefore it is felt to be unnecessary to show the internal arrangement of these valves.

Communication plug 59 is shaped to be received into the inner stepdown arrangement of body opening 12. Each stepdown portion of plug 59 has a ring groove 60—66 surrounding its outer periphery. Each groove is disposed to register with the inner end of the corresponding passage 30—36, respectively, entering the stepped opening of the body 10. The plug passages 70—76, each of which is L-shaped through the plug, connect between each step of the plug, and the respective grooves 60—66 in register therewith, and the upper surface 77 of the plug. At surface 77, the passages each have a hose connection 80—86 screwed into its tapped upper end, the tapped formations not being shown in the drawings but being of usual form. Hoses 55 and 91—96 are connected to the plug passages by these connections.

Means for sealing between adjacent of the peripheral grooves 60—66 are provided by O-rings each disposed in a suitable ring groove above a groove 60—66 around each stepped section of plug 59.

Plug 59 is lowered into the body on the end of a pipe string, or other means (such as a wire line), which is connected to plug 59 by a suitable handling tool (not shown) engaging the inner recess 97 of a latching sleeve 98 surrounding the plug and held in place by nut 99 screwed onto the threaded upper end of plug 59. The plug is lowered into place and is caused to register with the guide funnel 15. Plug 59, upon being properly seated within opening 12, is then latched and held in position by a plurality of circularly arranged lugs 102. These lugs are disposed between the outer periphery of plug 59 and an outer tubular sleeve 103, which is screwed to plug 59 at threads 104, when the weight of plug 59 is supported by the upper surface of flange 105 of sleeve 98 engaged with nut 99, this being the normal position of these parts during lowering of the plug into opening 12. The latch means is of a type commonly used in securing one tubular member co-axially end-to-end with another of larger diameter, having circularly arranged lugs in openings in the inner member which are moved outwardly to engage the outer member by means moved behind the inner sides of the lugs. A similar latch means is shown in the "Composite Catalog of Oil Field Equipment and Services," 23rd revision, 1958–59, volume 1, published by World Oil, Gulf Publishing Co., Houston, Texas, at page 1093, FIGURE 54, wherein lugs are shown backed up by a sleeve to be held in a circular groove.

The lugs are released by upward movement of the sleeve.

Sleeve 103 has a plurality of circularly arranged window openings 106 there around (only two being shown), and each lug 102 is freely movable through one of the window openings so that it can be pushed against plug 59 to a retracted position when the plug is moved through a confined space, it being necessary for flange 105 to be against nut 99 in order for this to occur.

After plug 59 has seated in opening 12, further downward motion imparted to sleeve 98 by the handling tool engaged at recess 97 moves the lower beveled surface of sleeve 98 against the upper beveled surfaces of lugs 102, forcing the lugs outwardly through window openings 106 and into an interior annular recess 107 of body 10. When lugs 102 are in place in recess 107, sleeve 98 is moved down until flange 105 bottoms in its space, so that the lower end of sleeve 103 backs up the lugs which cannot then be withdrawn from recess 107. This structure, when thus latched in place, positively holds plug 59 in its proper position within opening 12 of body 10, and in this position the flow control to be further described can be utilized.

When the plug 59 has been secured in place the handling tool may be removed. The apparatus is in condition for hydraulic pressure to be supplied through hose 55 from a remote control point, for example at the surface of a body of water beneath the surface of which the multiple valve device is disposed, and is transmitted through the plug and body passages 70, 30 into manifold pipe 40 from which it enters and opens each of the hydraulic valves 51—53, etc. of the pipes 41—46. If the device is used in connection with a well, and each pipe 41—46 is connected to an annular well space, pressures can be observed and gases or fluids can be bled off or pumped into the annular spaces through the described flow connections. Obviously other controls, such as ordinary valves, may be provided for hoses 91—96 so that pressure or fluid in any one or more of the pipes 41—46 may be measured or collected at the control point. The pressure required to actuate valves 51—53, etc., is greater than the hydraulic pressure imposed by a depth of water above body 10 so that the valves will not be accidentally opened when plug 59 is removed. When the valves have closed and all pressure within the body allowed to release, plug 59 is removed by upsetting motion of the handling pipe string which has been reconnected at recess 97. This motion raises sleeve 98 allowing lugs 102 to retract and the plug can be removed from the body.

To protect the finished surfaces in the inner portions of body 10 when the plug 59 has been removed, a blank plug 10 (FIGURE 3) is inserted into the body in place of plug 59. Blank plug 110 is installed and latched into the body in a manner similar to the installation of plug 59, except that the handling string is released upon setting and latching blank plug 110, thereby permitting the handling string to be retrieved. Blank plug 110 can subsequently be removed from body 10 using a pipe string or other means attached to a member which will engage the extension 111 connected to blank plug 110 upon contact. Such means are well known in the art.

The lower section 26 of opening 12, as heretofore stated, terminates above the lower end of body 10. Plug 59 and blank plug 110 do not reach the lower end of opening 12 so that trash accumulation space 112 is provided at the lower end of the opening. Alternatively, where the water is of high silt or trash content, space 112 may extend through the bottom of body 10 and through the plate 11 so that the lower end of opening 12 will not become filled and prevent introduction of either plug. An additional O-ring seal around the lower end of plug 59 below groove 66 must be provided in that case so that groove 66 will be sealed off both above and beneath.

As is shown in FIGURE 3, blank plug 110 is surrounded at its upper parts by a latch means like that of plug 59. Of the latch elements, sleeves 115, 116, lugs 117, nut 118, and flange 119, respectively perform the same latching functions as do sleeves 103, 98, lugs 102, nut 99, and flange 105 as shown in FIGURE 1 and heretofore described. However, sleeve 116 has the previously mentioned extension 111 which extends to above the upper end of funnel 15. A cover 121, having a central opening therethrough to receive extension 111 of sleeve 116, is secured to extension 111 in any suitable way, such as by weld 122. Cover 121 is at a point along the length of extension 111 such that it fits closely against the upper edge of funnel 15 when blank plug 110 is seated in the stepped lower part of opening 12. Cover 121 corresponds in shape with funnel 15, usually circular, and has a down-turned edge flange 124 which overhangs the edge of the funnel. Thus, with blank plug 110 latched in seated position within opening 12, cover 121 closes the funnel opening so that sediment and other detritus is prevented from entering opening 12.

Blank plug 110 can be removed from opening 12, as has already been mentioned, by a suitable handling tool such as are known in the art capable of engaging extension 111 at recess 126 therearound.

Annularly within the cylindrical upper part 14 of opening 12, there is a latch device 128 which is provided as a handling means for the body 10. The device can also be replaced by one of similar construction, but of greater length, in order to extend the height of body 10 if so desired. Latch device 128 includes sleeve 129 having a plurality of circularly arranged window openings therearound. A slidable sleeve 131 fits within sleeve 129 and has thickened upper part 132 thereabove which fills the annular space within body 10 around extension 111 and which, when extension 111 is not in place, provides an inner surface flush with part 18 of opening 12. Part 132 of sleeve 131 has an interior annular recess 134 having upper and lower conical sides. The conical upper end 135 of sleeve part 134 augments surface 16 and funnel 15.

An inner sleeve 136 is screwed at its lower end to the lower end of sleeve 129 at 137. Sleeve 131 slidingly fits between sleeves 129, 136 and has an interior annular flange 138 movable between an outer shoulder of sleeve 136 formed by a ring nut 140 screwed onto the upper end of sleeve 136 and extending outwardly therearound and the lower end of the annular space wherein nut 140 and flange 138 are disposed. A pipe string supported handling tool (not shown) of suitable form engages in recess 134. Upward movement of sleeve 131 permits the plurality of latching lugs 141 which are freely disposed each in an opening 130, to move out of an interior annular recess 142 within opening part 14 of opening 12. Downward movement of sleeve 131 forces the lower part of sleeve 131 to behind lugs 141 so that they are held extended into recess 142. Thus, latch 128 may be removed by upward force applied at recess 134.

The described apparatus provides a secure, remotely operable connection between conduits 40—46 and conduits 55 and 91—96. It provides for remote operation of valves 51—53, etc., by means of hydraulic pressure applied through line 55. It may be blinded or blanked off by means of blank plug 110. It may be controlled either remotely or not as desired, and therefore provides a universal valved connection for many applications, particularly for wells which have their completion components in inaccessible places.

While a preferred embodiment of the invention has been shown and described herein, many modifications thereof may be made by a person skilled in the art without departing from the spirit of the invention, and it is intended to protect by Letters Patent all forms of the invention falling within the scope of the following claims.

What is claimed is:

1. A plural conduit connection and flow control device, comprising a body having an opening at an outer surface thereof, a plurality of passages through said body communicating with said opening from other outer surfaces of said body, a valved conduit exterior of said body connected with each of said body passages at said other outer body surfaces, an additional passage through said body communicating with said opening from another outer surface of said body, a plug element removably disposed within said opening, said plug element having a plurality of passages therethrough each in communication with one of said plurality of body passages at the wall of said opening at one end and each terminating adjacent said opening at the other end, said plug element also having an additional passage therethrough in communication with said additional body passage at the wall of said opening at one end and terminating adjacent said opening at the other end, conduit means connected to each of said plurality of plug passages at its said end adjacent said opening, a manifold pipe means exterior of said body connected between said additional body passage and the valve of each said valved conduit, a hydraulic fluid supply conduit connected to said additional plug passage at said end thereof adjacent said opening, hydraulic fluid introduced under pressure through said hydraulic fluid supply conduit passing through said additional plug and body passages to said manifold pipe to actuate said valves of said valved conduits.

2. The combination of claim 1, said valves of said valved conduits being of a type actuated to open in response to said pressured hydraulic fluid supplied thereto through said manifold pipe, whereby said valves are closed when said hydraulic fluid supply conduit is not under pressure and when said plug element is removed from said body opening.

3. The combination of claim 2, including seal means surrounding each said communication between body and plug element passages and disposed between said body and said plug element within said body opening, said conduit means and said hydraulic fluid supply conduit connected to passage ends adjacent said opening being flexible hoses.

4. The combination of claim 1, said plug element including handling tool engaging means, whereby said plug element may be inserted into and removed from said body opening by engagement by a suitable handling tool.

5. The combination of claim 4, including cooperating latching means on said body and plug element for holding said plug element in releaseable fixed positions in said body opening, said latching means being latched and released by suitable movement of a said engaged handling tool.

6. The combination of claim 5, said body including connection means around said body opening for connection of tubular means for longitudinally extending said body and body opening, said connection means being operable remotely by a suitable handling means engaged with said tubular means.

7. The combination of claim 1, including cooperating latching means on said body and plug element for holding said plug element in releasable fixed positions in said body opening.

8. The combination of claim 1, said plug element and body opening each having a series of coaxial cylindrical stepwise reduced portions from their ends at the entrance of said body opening to the other ends thereof, there being a said plug passage end at each reduced portion of said plug element.

References Cited in the file of this patent

UNITED STATES PATENTS

| | | |
|---|---|---|
| 1,293,753 | Gibson | Feb. 11, 1919 |
| 2,308,137 | White | Jan. 12, 1943 |
| 2,576,300 | Kreiner | Nov. 27, 1951 |
| 2,771,094 | Bailey | Nov. 20, 1956 |